June 22, 1948.   W. O. BENNETT, JR   2,444,016
GEAR TESTING APPARATUS
Filed March 31, 1945

Inventor:
WILLIAM O. BENNETT, JR.
BY M. Gould
Attorney:

Patented June 22, 1948

2,444,016

UNITED STATES PATENT OFFICE 2,444,016

GEAR TESTING APPARATUS

William Ogle Bennett, Jr., Lancaster Township, Lancaster County, Pa., assignor to Hamilton Watch Company, Lancaster, Pa.

Application March 31, 1945, Serial No. 585,915

4 Claims. (Cl. 73—136)

This invention relates to an apparatus for determining the torque transferred between two meshing gears and provides means for measuring the degree of constancy of said torque output with constant torque input and for various angular positions of said gears.

The object of the present invention is to provide an apparatus by means of which the torque transfer between two meshing gears can be measured.

A further object of the present invention is to provide an apparatus through which a constant torque may be applied to one of a pair of meshing gears and the constancy of transfer of said torque determined during various angular increments of relative gear tooth positions.

A further object of the present invention is to provide a constant torque on one of a pair of meshing gears and a variable resistance on the other of said meshing gears with means to measure the necessary variation in said resistance to balance the torque transferred from said constant torque source to thereby measure the variation in torque caused by the rotation of the gears to different meshing positions.

A still further object of the present invention is to provide a rotatable support carrying one of a pair of meshed gears having a constant torque applied thereto and to rotate said support so that the center of said gear rotates about the center of the other of said pair of meshed gears and to provide means for measuring the constancy of torque transfer between said gears.

A still further object of the present invention is to provide a simple means for balancing the torque transfer through a pair of meshed gears and indicating means showing the moment of force required to balance said torque.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawing in which.

Figure 1:
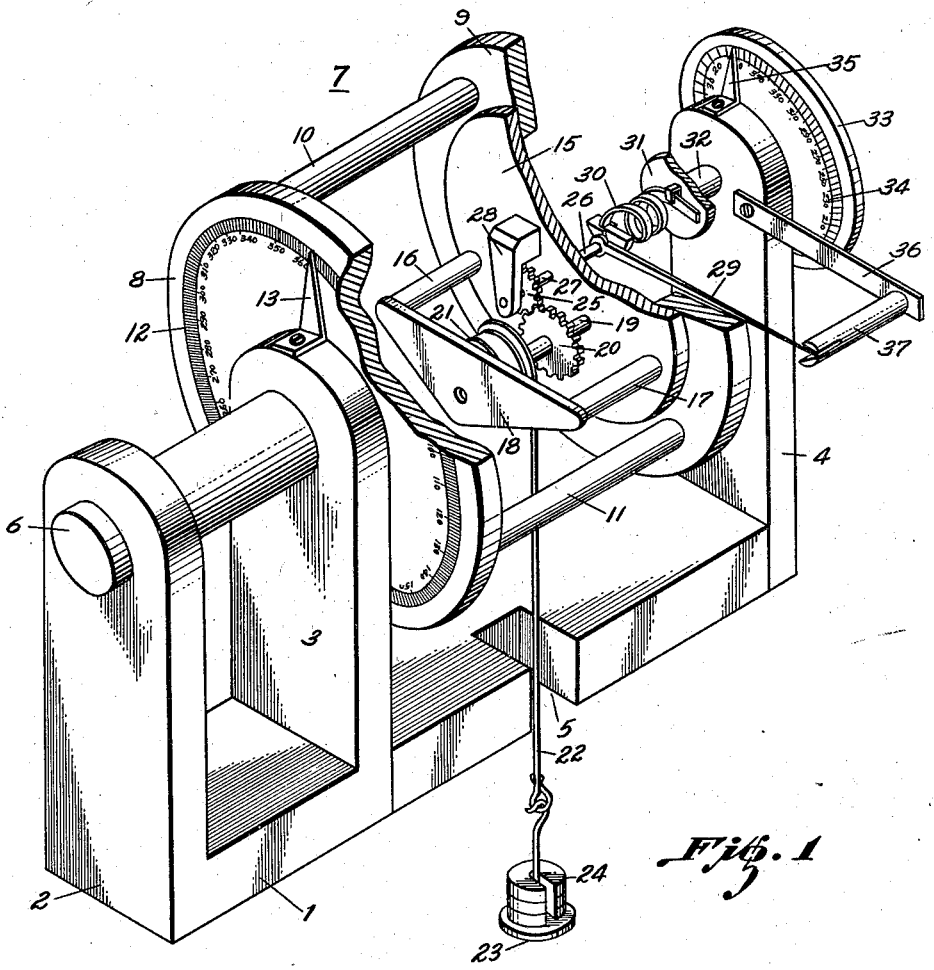
Fig. 1 is a broken perspective view of the torque measuring apparatus.
Figure 2:
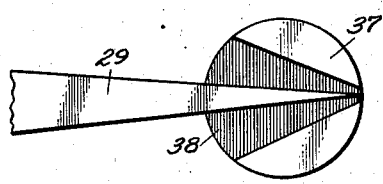
Fig. 2 is a detailed view of the indicating pointer.

The apparatus as conventionally illustrated shows a base 1, having upstanding vertical walls 2, 3 and 4 and a cut out portion 5. Journaled in the upstanding walls 2 and 3 is a shaft 6 carrying a support 7 comprising a front and rear disc 8 and 9 connected by rods 10 and 11.

The front disc 8 carries a scale indication 12 adapted to be read against an index pointer 13 carried on the upstanding wall 3. Secured to the back disc 9 is a circular plate 15 which is carried concentric with said back disc.

The plate 15 is secured to the disc 9 by nuts (not shown) threaded on the back of rods 16 and 17 which are formed with shoulders abutting the plate 15 and reduced portions which pass through 15 and 9 to receive the securing nuts. The rods 16 and 17 support a bridge 18 which serves as a bearing for the shaft 19 carrying one of the meshing gears.

The shaft 19 also carries a drum 21 on which is wound a cable 22 carrying a weight supporter 23 adapted to receive a number of weights 24 to produce a constant force at the circumference of the drum, which force is transmitted through the drum 21 and shaft 19 to produce a torque in gear 20 which is in mesh with gear 25.

Gear 25 is mounted on a shaft 26 which is journaled at 27 in circular plate 15 and cock 28 which is mounted on and carried by said plate 15. Shaft 26 is mounted centrally of circular plate 15 and carries an indexing hand 29. Secured to the end of the shaft 26 is a measuring spring 30 which is shown here in the form of a helical spring secured at one end to the shaft 26 and at the other to a plate 31.

The plate 31 is mounted on shaft 32 aligned with shafts 6 and 26 journalled in upstanding wall 4 and terminating in a large circular disc 33 having a graduated scale 34 on one face thereof. Scale 34 is adapted to be read with a torque index pointer 35 carried on the upstanding wall 4. Also secured to the upstanding wall is an arm 36 having an index rod 37 extending at right angles therefrom. The rod 37 is cut away at its outermost end to form a V-shaped groove 38 (cross section of the rod) which receives the indicating pointer 29, making it possible to easily observe when the torque on shaft 26 is balanced by the tension in spring 30.

In the operation of the testing device the pair of gears to be tested is mounted in the position of gears 20 and 25, the weights hung on the support 23 and the resulting torque on shaft 26 balanced by tensioning the spring 30. This tensioning is done by turning disc 33, shaft 32 and plate 31 until balance is indicated by pointer 29 in conjunction with the index rod 37. A reading on gear position scale 12 and torque scale 34 is taken. The support 7 is then rotated on its shaft 6 turning the gear 20 in mesh with the gear 25 a small rotational increment about said gear 25. Any change in the torque transfer can be easily noted by observing the hand 29 and its relative position in the V-shaped groove 38 of the index rod 37. Should there have been any change in the position of the hand 29 this change is balanced by increasing or decreasing the tension on the spring 30 and the reading of the scale 34 taken to correspond with the new reading of scale 12. By a series of such steps it is possible to determine the constancy of transfer of torque between the two gears for any relative position of contact of the teeth.

What is claimed is:

1. An apparatus for measuring torque transfer between a pair of meshing gears comprising a gear supporting member mounted for rotation about an axis, a plate carried by said member and secured to one end thereof, a shaft mounted coaxially with said axis, a second shaft, means journaling said second shaft coaxially with said plate mounted shaft, a measuring spring member connecting said shafts, a bridge carried by said plate and parallel thereto, means for mounting one of said gears to be tested between said bridge and said plate, said plate mounted shaft carrying the second gear of said meshing gears to be tested, means for exerting a constant torque on said first mentioned gear, and means for indicating a balance of torque between said plate mounted shaft carrying said second gear and said second shaft.

2. An apparatus for measuring torque transfer between a pair of meshing gears comprising a gear supporting member mounted for rotation about an axis, a plate carried by said member and secured to one end thereof, a shaft mounted coaxially with said axis, a second shaft, means journaling said second shaft coaxially with said plate mounted shaft, a measuring spring member connecting said shafts, a bridge carried by said plate and parallel thereto, means for mounting one of said gears to be tested between said bridge and said plate, said plate mounted shaft carrying the second gear of the pair of meshing gears to be tested, means for exerting a constant torque on said first mentioned gear, means for indicating a balance of torque between said plate mounted shaft carrying said second gear and said second shaft, and a graduated disc carried by said second shaft for indicating the amount of said torque applied by said spring.

3. An apparatus for measuring torque transfer between a pair of meshing gears comprising a gear supporting member mounted for rotation about an axis, a plate carried by said member and secured to one end thereof, a shaft mounted coaxially with said axis and in said plate, a second shaft, means journaling said second shaft coaxially with said plate mounted shaft, a coiled spring member connecting said shafts, a gear mounted for rotation on said plate, a second gear in mesh with said first gear and carried by said plate mounted shaft, means for exerting a constant torque on said first mentioned gear, an indicating balance finger mounted on said plate carried shaft to indicate balance of torque on said shaft and means for turning said second shaft and said connected coil spring to balance the torque on said plate carried shaft and bring the balance indicator to neutral position.

4. An apparatus for measuring torque transfer as claimed in claim 3, including a graduated disc attached to said second shaft, said disc carrying a scale for indicating the amount of said torque necessary to bring the torque balance indicator to neutral position.

WILLIAM OGLE BENNETT, Jr.

REFERENCES CITED

The following references are of record in the file of this patent:

UNITED STATES PATENTS

| Number | Name | Date |
|---|---|---|
| 2,352,906 | Lyons | July 4, 1944 |

FOREIGN PATENTS

| Number | Country | Date |
|---|---|---|
| 96,334 | Germany | Feb. 25, 1898 |
| 314,925 | Germany | Oct. 18, 1919 |
| 675,150 | Germany | Apr. 29, 1939 |